United States Patent [19]

Gatti

[11] Patent Number: 4,756,187

[45] Date of Patent: Jul. 12, 1988

[54] APPARATUS FOR MANEUVERING AND PERFORMING MEASUREMENTS ON RAIL VEHICLES

[75] Inventor: Guido Gatti, Turin, Italy

[73] Assignee: Fiat Ferroviaria Savigliano S.p.A., Italy

[21] Appl. No.: 86,597

[22] Filed: Aug. 18, 1987

[30] Foreign Application Priority Data

Sep. 5, 1986 [IT] Italy ............................... 67693 A/86

[51] Int. Cl.⁴ .......................................... G01G 19/04
[52] U.S. Cl. .................................... 73/146; 104/23.2; 177/136
[58] Field of Search ................. 73/146; 104/23.2, 23.1; 177/136

[56] References Cited

U.S. PATENT DOCUMENTS 3,714,997  2/1973  Ahl et al. .............................. 177/136
3,734,216  5/1973  Norstrom et al. ................... 177/136
4,574,705  3/1986  von Winckelmann ............ 104/23.2

Primary Examiner—Donald O. Woodiel
Attorney, Agent, or Firm—Andrus, Sceales, Starke & Sawall

[57] ABSTRACT

An apparatus for maneuvering and performing measurements on rail vehicles, which apparatus comprises a number of platforms, each designed to travel on a horizontal surface and having pneumatically supported traversing means for moving the platform over the aforementioned surface, a pair of parallel guides for supporting and enabling rolling of the vehicle wheels, and measuring means; which appparatus also comprises a number of removable connecting devices, each designed to be set to a first configuration wherein it connects two adjacent platforms with the axes of the respective guides substantially in line, and a second configuration wherein the two adjacent platforms are separated.

19 Claims, 8 Drawing Sheets

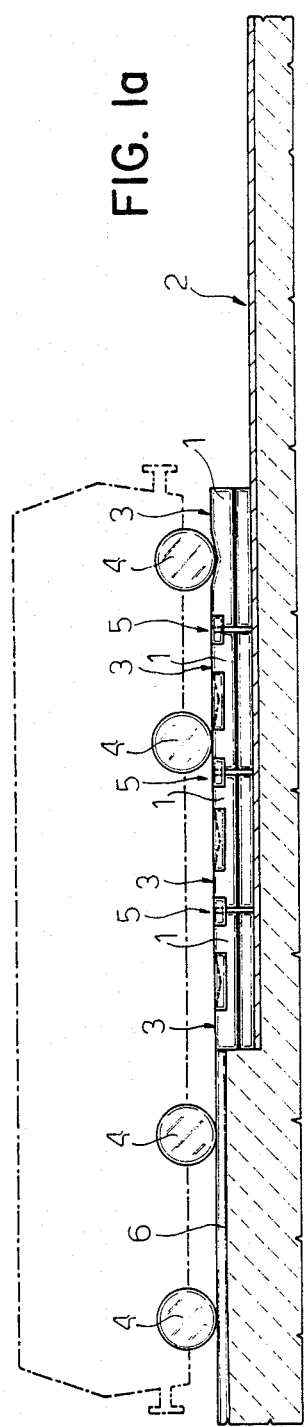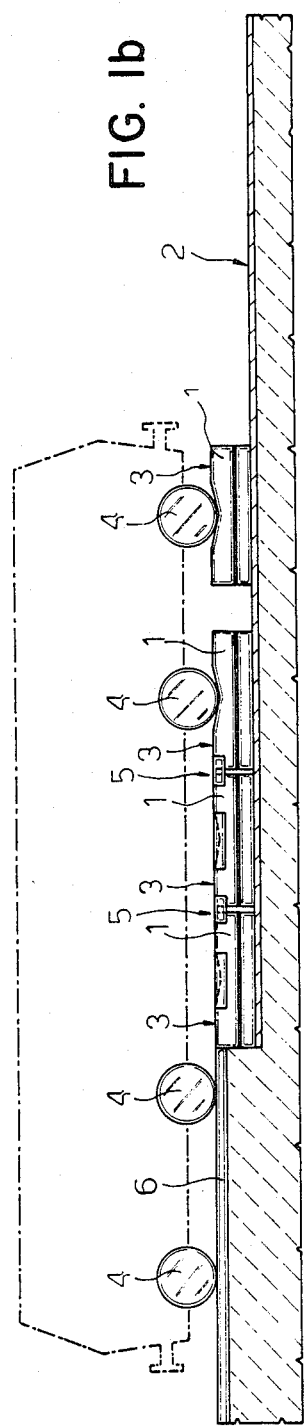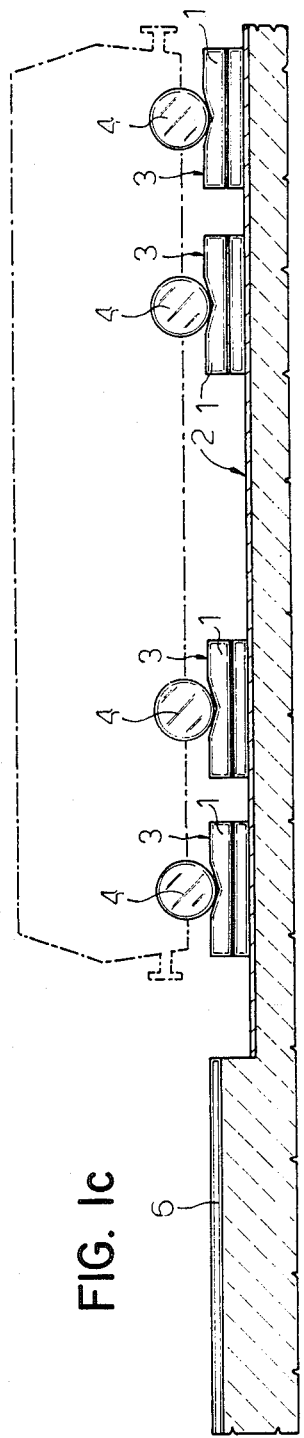

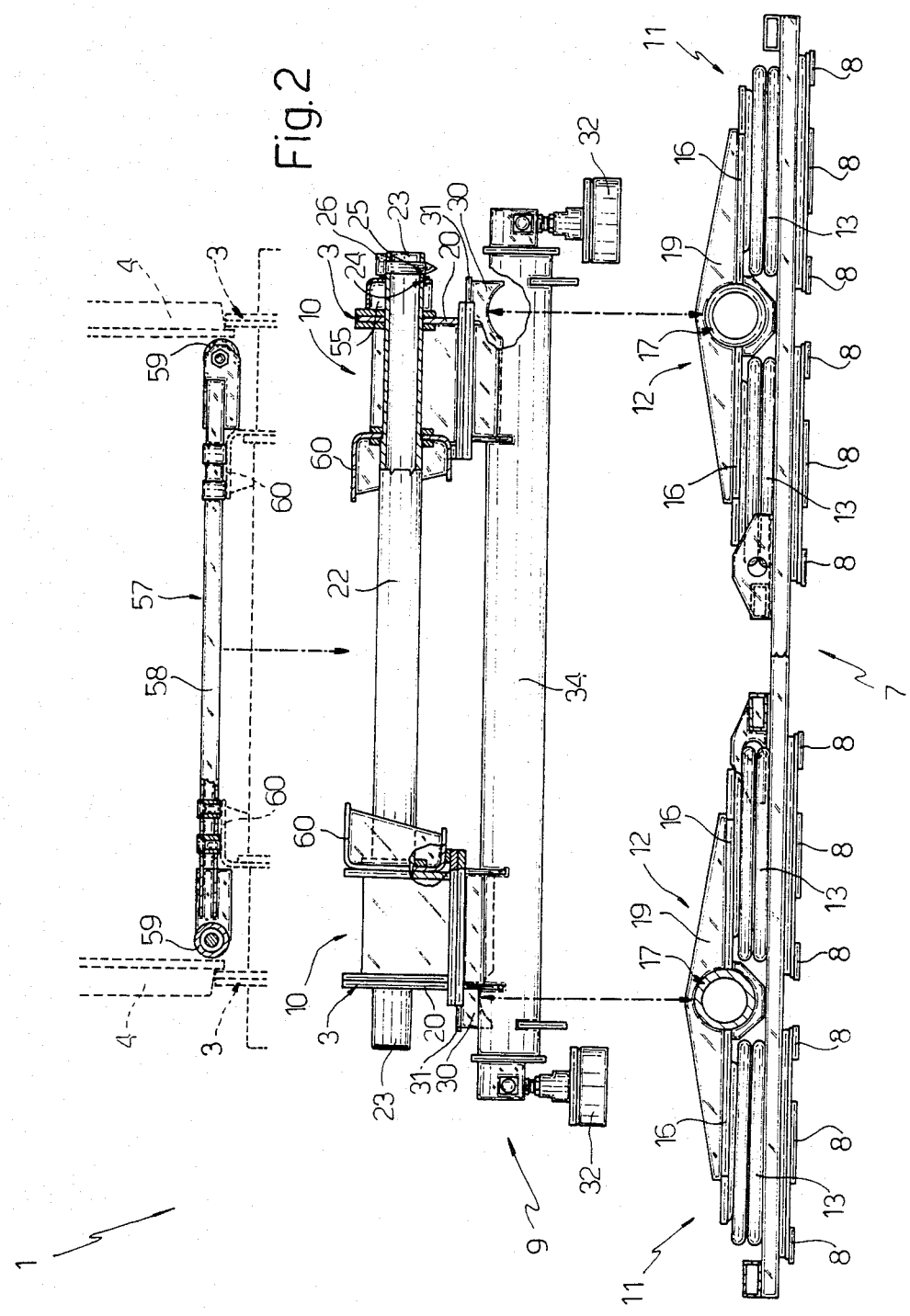

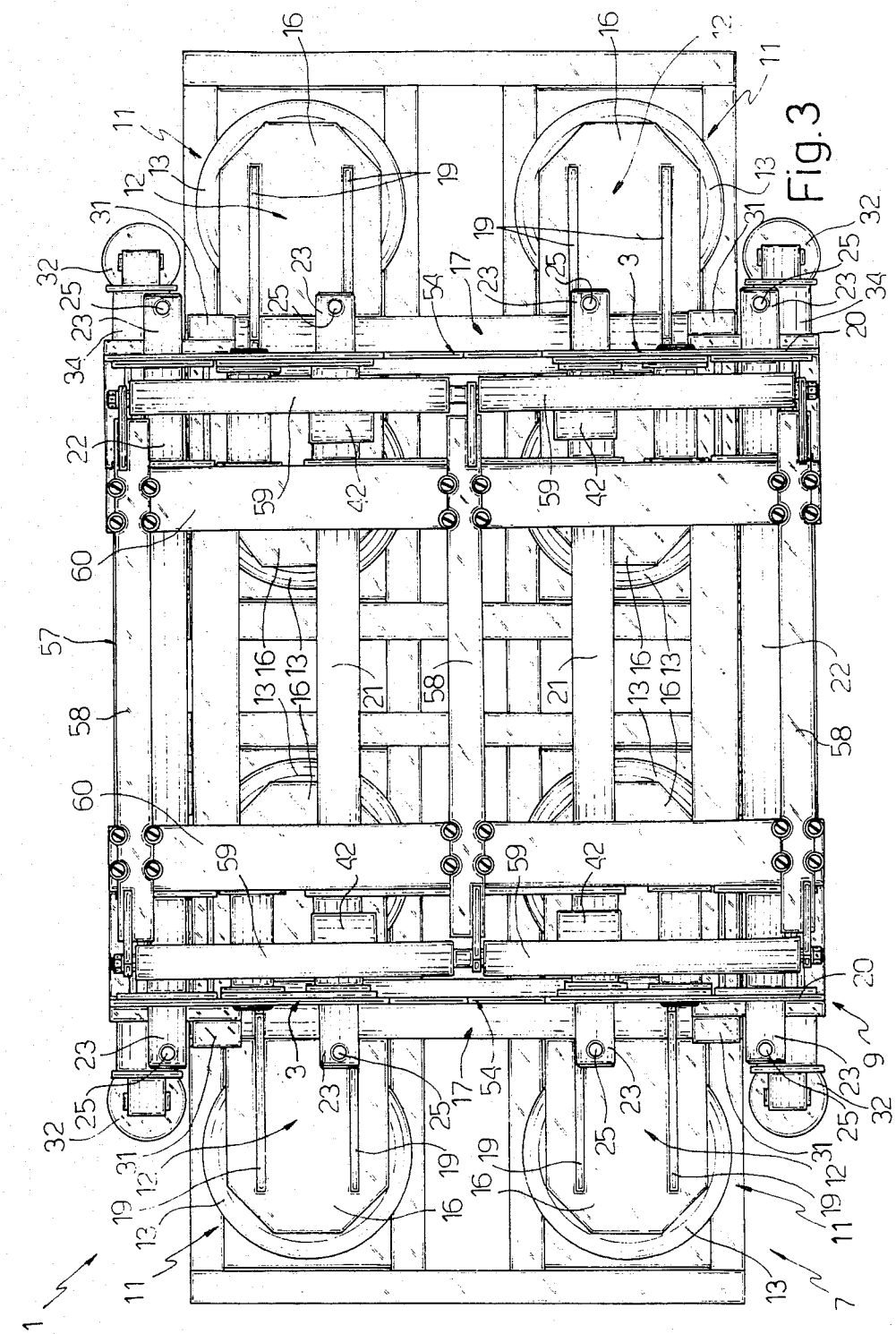

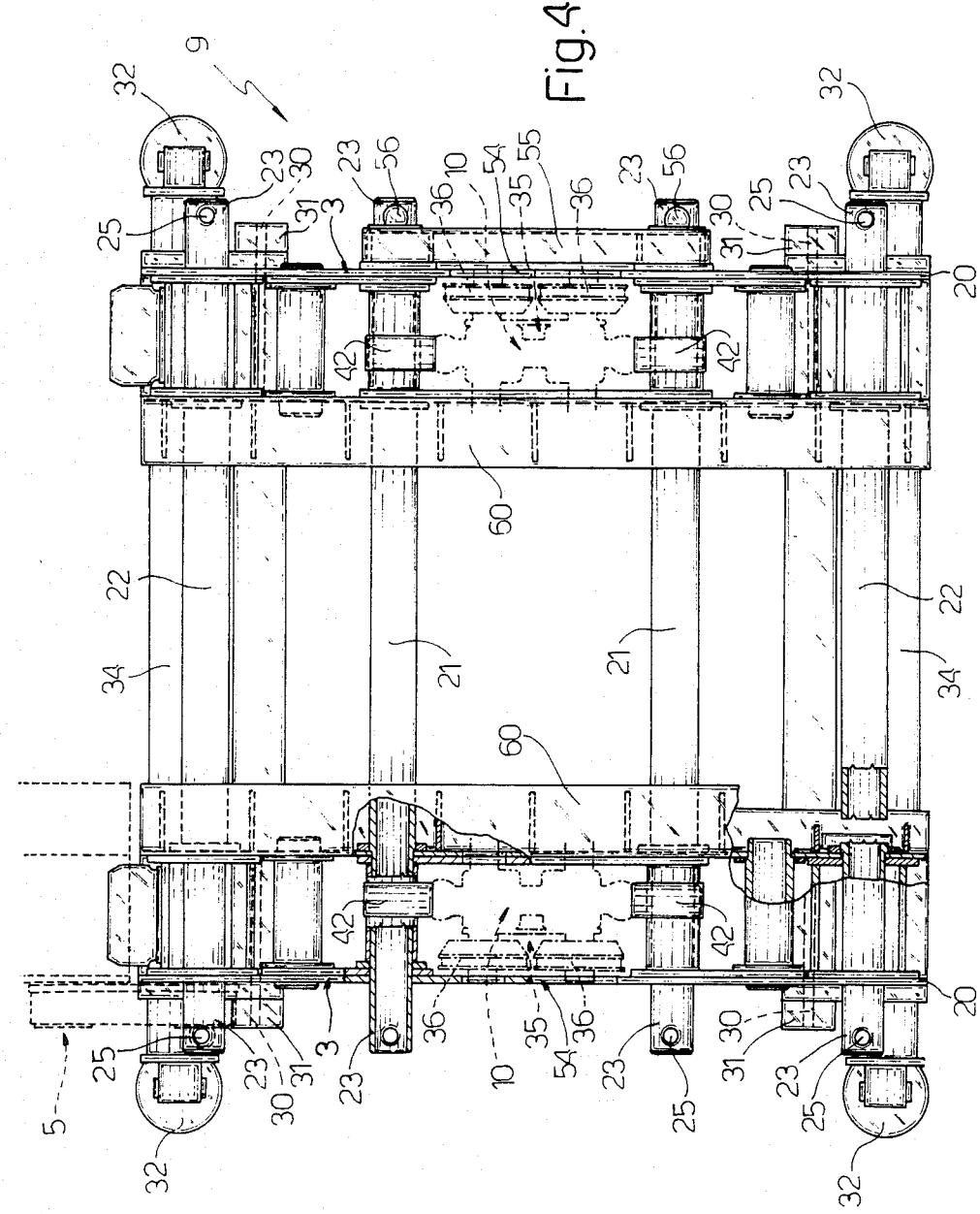

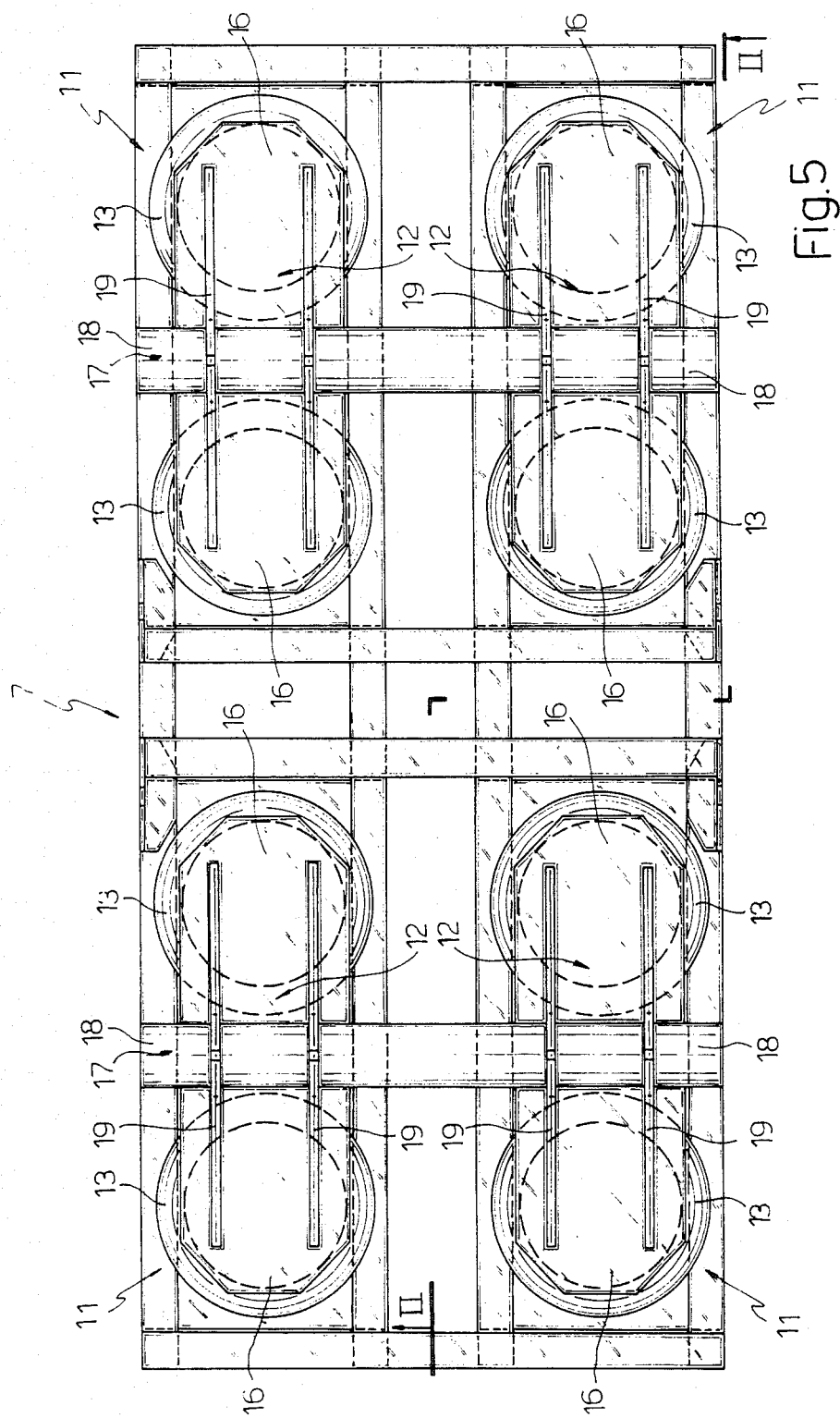

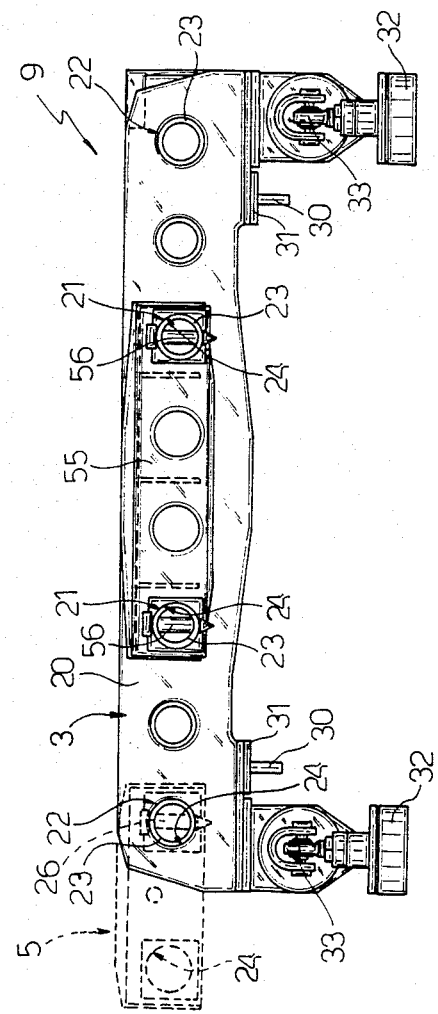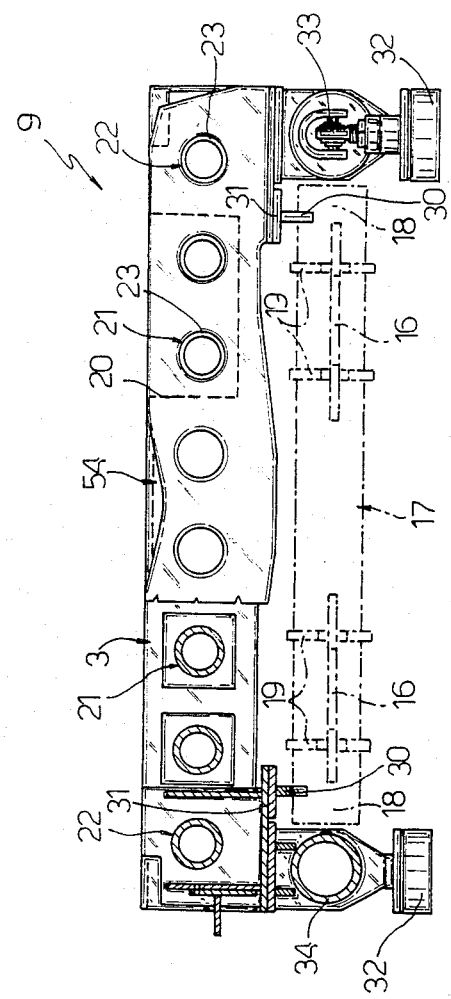

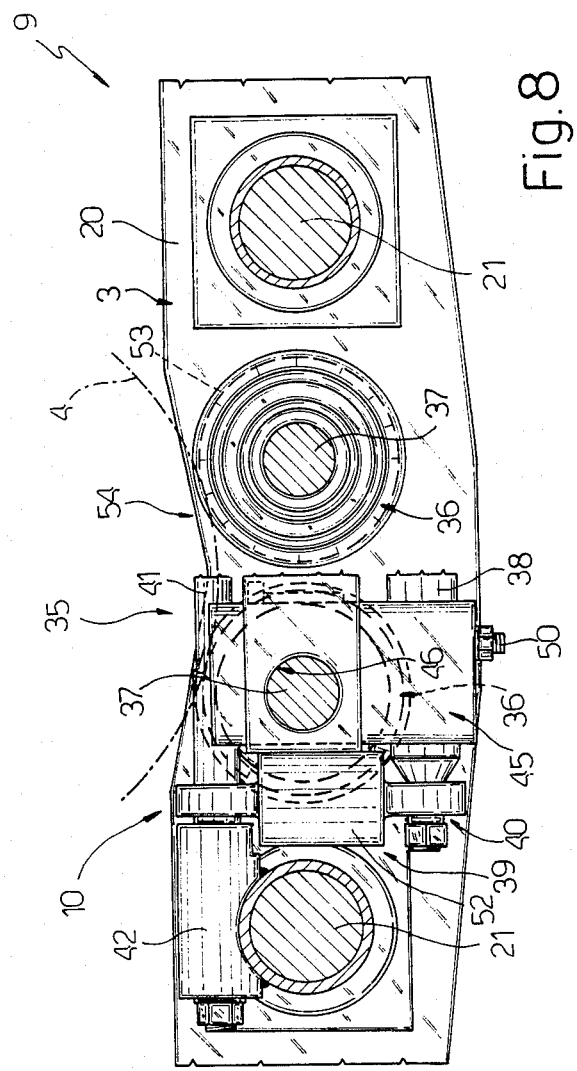

APPARATUS FOR MANEUVERING AND PERFORMING MEASUREMENTS ON RAIL VEHICLES

BACKGROUND OF THE INVENTION

The present invention relates to an apparatus for manoevering and performing measurements on rail vehicles.

Railroad vehicles often need manoevering into position within a given floor space, for example, inside a lockup, depot or workshop. In such cases, provision is usually made for a number of rail sections and trucks travelling along guides, each of which is provided with a short rail and designed to support and move the vehicle along the said guides.

Vehicle positioning using equipment of the aforementioned type requires a good deal of manoevering, both on the rail sections and the trucks. What is more, the said equipment is fairly complex and cumbersome, due to the large number of rail sections and trucks involved, which occupy practically the whole of the surface area within which the vehicles are to be positioned.

Test measurements must also be made at times, both on prototype vehicles at the final project stage, and on standard production vehicles as part of final testing or routine maintenance. The purpose of these measurements is to detect parameters such as the loads exchanged between each wheel and the rail, or the position of given points on the wheels or truck, for accurately determining, for example, the "natural" position of the wheel centres (i.e. unaffected by horizontal forces between the wheels and rails), parallelism of the wheel axles, and strain on the suspensions for a given vehicle attitude in relation to the rails.

Known equipment provides for performing a number of the aforementioned test measurements. One system provides for measuring the loads exchanged between the rail and wheel with the vehicle level, or with one rail raised, or on skew rails. Another provides for measuring strain on the suspensions in one of the said three configurations. Yet another provides solely for test measurements on the bare truck.

Each of the aforementioned measurements is usually made using a specific type of equipment, specially designed for the purpose and which more often than not cannot be employed for performing different tests. Whenever a series of test measurements is called for, a good deal of additional work is usually involved for setting up and positioning the equipment as required for testing. Another drawback of such equipment is that it does not provide for simulating all the rolling attitudes of the vehicle, or any special attitudes which might need investigating.

Finally, the said equipment only provides for simultaneously testing a number of the wheels on the vehicle, with the result that test findings are seriously affected by the support and constraint conditions of the remaining untested wheels.

SUMMARY OF THE INVENTION

The air of the present invention is to provide an apparatus for manoevering and performing measurements on rail vehicles, which apparatus provides for manoevering the vehicles into any position within a given surface area, and for performing the aforementioned measurements quickly and easily on all the vehicle axles.

With this aim in view, according to the present invention, there is provided an apparatus for manoevering and performing measurements on rail vehicles having a number of axles, characterized by the fact that it comprises a number of platforms, each designed to travel on a horizontal surface and having pneumatically supported traversing means for moving the said platform over the said surface, and a pair of parallel guides for supporting and enabling rolling of the wheels on one of the said vehicle axles; the said apparatus also comprising a number of removable connecting devices, each designed to be set to a first configuration wherein it connects two adjacent platforms with the axes of the respective said guides substantially in line, and a second configuration wherein the said two adjacent platforms are separated, so that, when the connecting devices of a series of platforms are in the said first configuration, the said platform are so connected as to enable the wheels on the vehicle axles to be rolled on to the respective guides, so as to position a given axle on the end platform of the said series, and, when the connecting device on the end platform of the said series is set to the said second configuration, the said end platform may be moved away from the others.

The said apparatus also comprises measuring means for measuring the loads exchanged between each of the said axles and the respective parallel guides on the platform

BRIEF DESCRIPTION OF THE DRAWINGS

The present invention will now be described in detail with reference to the accompanying drawings, in which:

FIG. 1 shows a schematic side view of three set-up configurations of the apparatus according to the teachings of the present invention;

FIG. 2 shows a side view of a platform on the apparatus according to the present invention, broken down into its major components;

FIG. 3 shows a plan view of the platform in FIG. 2;

FIG. 4 shows a plan view of a frame on the platform of the apparatus according to the present invention;

FIG. 5 shows a plan view of a further frame on the platform of the apparatus according to the present invention;

FIGS. 6 and 7 show two partially sectioned side views of the FIG. 4 frame;

FIG. 8 shows a side view of a dynamometric scale on each platform of the apparatus according to the present invention;

FIGS. 9 and 10 show a side section and plan view respectively of the dynamometric scale in FIG. 8.

DETAILED DESCRIPTION OF THE INVENTION

As shown in FIG. 1, the apparatus according to the present invention comprises a number of platforms 1, each designed to travel on a horizontal surface 2 and having pneumatically supported traversing means for moving the said platform 1 over the said surface 2. Each platform 1 comprises a pair of parallel guides 3 for supporting and enabling rolling of wheels 4 on the vehicle axle, as well as measuring means not shown in FIG. 1 but described in more detail later on. The apparatus according to the present invention also comprises a number of removable connecting devices 5, each designed to be set to a first configuration wherein it connects two adjacent platforms 1 with the axes of guides 3 substantially in line, and a second configuration wherein the said two adjacent platforms 1 are separated. The apparatus shown by way of example in FIG. 1 comprises four platforms 1, which, in FIG. 1a, are shown connected together by connecting devices 5. In FIG. 1b, the end platform 1 has been separated from the adjacent one by setting the respective connecting devices to the said second configuration. In FIG. 1c, all the platforms 1 are disconnected, and all the respective connecting devices therefore in the said second configuration.

As shown clearly in FIG. 1, horizontal surface 2 is lower than the surfaces supporting vehicle rails 6, and the height of platform 1 is substantially equal to the difference in height between the said two surfaces, so that the respective upper surfaces of guides 3 and rails 6 are substantially flush.

For enabling each platform to be moved along surface 2 using pneumatically supported traversing means, the said surface 2 must be perfectly smooth with no more than a 1 in 1000 gradient, so as to minimise any horizontal forces which might affect the "natural wheel position" measurement.

Each platform 1, which is shown broken down into its major components in FIG. 2, substantially comprises a first frame 7 having the said pneumatically supported traversing means 8. The said means 8 may be of any known type designed to emit compressed air jets on to horizontal surface 2 for pneumatically supporting platform 1 and creating a thin cushion of air between platform 1 and horizontal surface 2 for eliminating sliding friction. Platform 1 also comprises a second frame 9 having the said pair of guides 3 for vehicle wheels 4, and supporting the said measuring means indicated as a whole by 10 and shown schematically in the plan view of second frame 9 in FIG. 4. Between the said first and second frames 7 and 9, there are provided lifting means 11 for raising the said second frame 9 in relation to the said first frame 7 as described in more detail later on. The said lifting means 11 substantially comprise four lifting devices 12 substantially arranged in the form of a rectangular and each designed to raise a respective portion of second frame 9. Each lifting device 12 is air-powered and comprises a pair of tubular bellows 13 formed from deformable material, and onoff means (not shown) for enabling compressed air to be supplied inside and exhausted from the same. Each pair of bellows 13 is connected at the bottom end to first frame 7 and at the top end to a respective supporting plate 16. As shown clearly in the plan view of first frame 7 and lifting means 11 in FIG. 5, the plates 16 of each pair of devices 12 are connected by a tubular element 17 on which is formed a pair of supporting seats 18 for second frame 9. For strengthening the connection between each plate 16 and respective tubular element 17, provision is conveniently made for a pair of ribs 19.

Second frame 9 (FIGS. 2, 3, 4, 6 and 7) comprises a pair of side panels 20, each designed to form one of the said guides 3, and at least two pairs of cross members 21 and 22 (FIG. 1) for connecting side panels 20. Measuring means 10 are connected to the first pair of cross members 21 in the centre of the frame, and each cross member 22 in the second pair is designed to support one of the said connecting devices 5 for connecting two adjacent platforms 1. As shown clearly in the accompanying Figures, cross members 21 and 22 are conveniently tubular in shape and present portions 23 projecting from the front surface of side panels 20. As shown clearly in FIG. 6, each connecting device 6 is in the form of a plate having a pair of holes 24, each designed to receive one of projecting portions 23 on one of end cross members 22. In each of the said projecting portions 23, there is formed a radial hole 25 designed to receive a pin 26 (FIG. 6) for locking connecting plate 5 in relation to respective projecting portion 23.

Second frame 9 also comprises two pairs of saddles 30 (FIGS. 2 and 6) each designed to rest on one of supporting seats 18 formed on tubular element 17 of second frame 9. The said saddles 30 in each pair are conveniently secured to a further cross member 31 on frame 9 (FIG. 4).

Second frame 9 also presents two pairs of feet 32 (FIGS. 2 and 4) designed to rest on surface 2 and arranged in the form of a rectangle. The feet 32 in each pair are connected by ball joints 33 (FIG. 6) to a respective conveniently tubular cross bar 34 having its axis parallel with those of cross members 21 and 22. The said bars 34 are secured to the ends of side panels 20 on second frame 9, as shown in FIGS. 6 and 7.

Figures 9, 10:
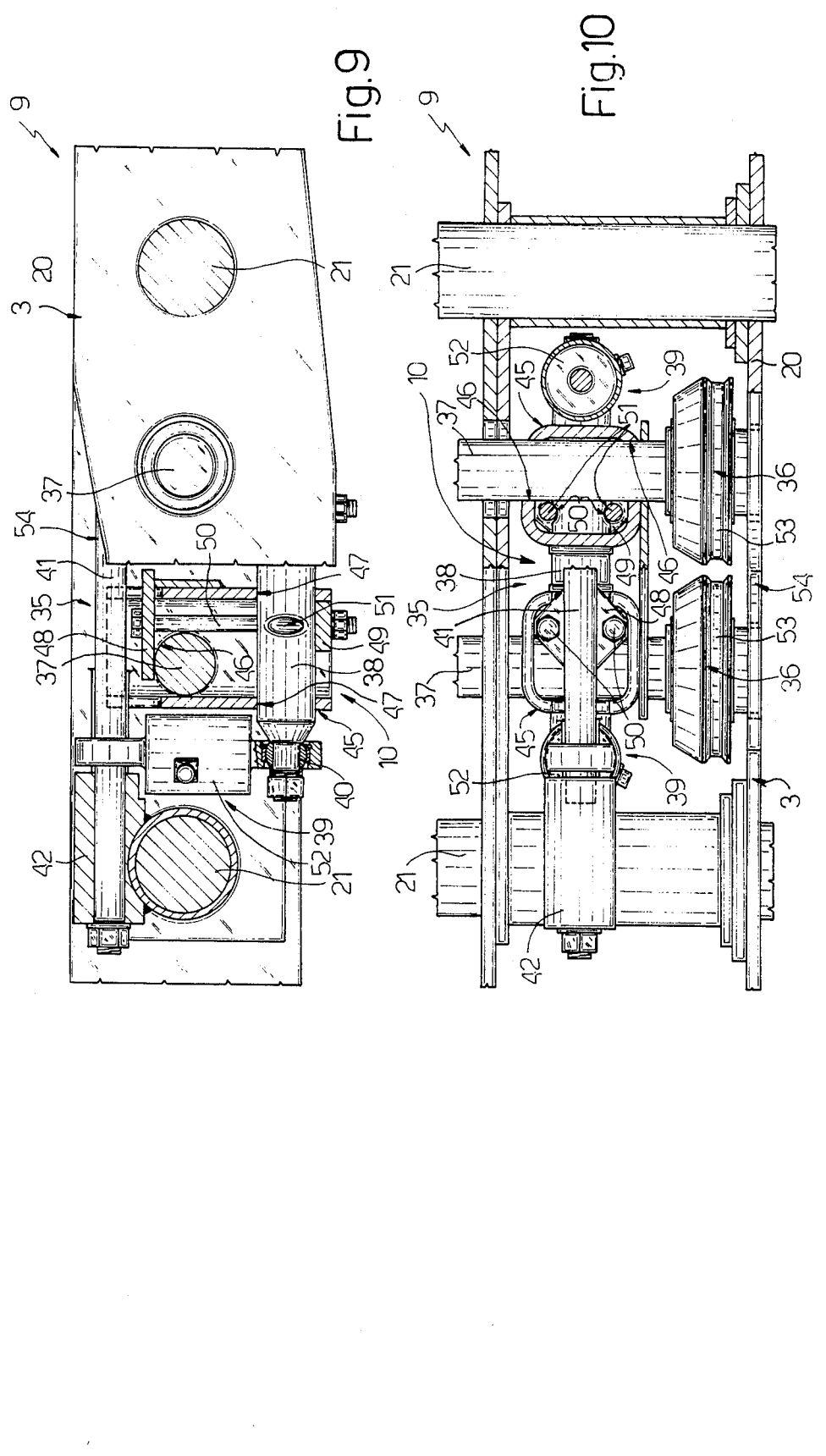

Measuring means 10 on each platform 1 substantially comprise a pair of dynamometric scales 35 (FIGS. 8, 9, 10) each located on one side of second frame 9, inside a respective side panel 20 (FIG. 4). Each said scale 35 presents a pair of discs 36 designed to support a wheel 4 of one axle, and each of which turns in idle manner on the end of a respective shaft 37 having its axis parallel with the axes of cross members 21 and 22 on second frame 9. Scale 35 also comprises a yoke 38 having its axis perpendicular to the axes of shafts 37 and connected to the ends of the same, and a pair of vertical ties 39, the bottom ends of which are connected by ball joints 40 to the end of yoke 38. The top ends of yokes 38 are secured to a bar 41 having its axis parallel with that of yoke 38 and which is inserted inside a pair of bushes 42, each of which is secured to a respective cross member 21 on second frame 9.

Each of shafts 37 is conveniently connected to yoke 38 by means of a tubular housing 45 (FIGS. 9 and 10) in which are formed a first pair of holes 46 fitted through with shaft 37, and a second pair of holes 47 perpendicuar to the first and fitted through with yoke 38. For strengthening the connection, there is provided, between the shaft and housing, a pair of plates 48 and 49 resting respectively on shaft 37 and yoke 38. The said plates are provided with a pair of holes fitted through with the shanks of a respective pair of bolts 50 tightened in such a manner as to exert, via the said plates 48 and 49, given pressures on shaft 37 and yoke 38. The shank of each bolt 50 conveniently rests on a seat 51 formed on yoke 38 as shown in FIG. 9.

Along each tie 39, there is inserted a load cell 52 for detecting the axial force exerted along tie 39, and which is connectable to appropriate electronic measuring equipment.

Each of discs 36 presents an annular groove 53 (FIG. 10) for housing the rim of a vehicle wheel 4. For this purpose, each side panel 20 on frame 9 presents, next to each respective pair of discs 36, a V-shaped recess 54 (FIGS. 7 and 9) for interrupting the continuity of the guide 3 formed by side panel 20 and so causing the wheel 4 running along guide 3 to drop down between the said two discs 36 and to be supported solely by the same when over recess 54. Each side panel 20 also comprises a bridge type plate 55 (FIG. 6) connectable in removable manner to side panel 20 and designed to support wheel 4 when connected to side panel 20 as shown in FIG. 6 and so prevent wheel 4 from dropping down between the respective pair of discs 36. In FIG. 7, second frame 9 is shown without bridge plates 55. Each bridge plate 55 conveniently comprises a pair of holes, each designed to receive a respective projecting portion 23 of cross members 21. Each of the said projecting portions 23 presents a hole designed to receive a pin 56 for securing bridge plate 55 to the respective side panel 20.

The apparatus according to the present invention also comprises a third frame 57 (FIG. 2) fitted on top of second frame 9. The said frame 57, a plan view of which is shown in FIG. 3, substantially presents a number of cross members 58 (three in the embodiment shown) on the ends of which there are fitted in rotary manner two pairs of rollers 59 having their axes parallel with the respective side panel 20 and located close to the same so that the outer surface of each roller 59 rests against the inner surface of the wheel 4 resting on side panel 20. For supporting cross members 58 on third frame 57, second frame 9 conveniently presents a pair of side members 60 secured to cross members 21 and 22 on second frame 9 as shown in FIG. 2.

The measuring apparatus according to the present invention operates as follows.

When idle, platforms 1 are arranged substantially in line and connected together by connecting devices 5 as shown in FIG. 1a. For this purpose, each connecting device 5 is fitted on to respective projecting portions 23 of respective cross members 22 on frame 9 and locked on to the same by means of pins 26 (FIG. 6).

The vehicle for testing is rolled off rails 6 on to guides 3 on platforms 1, and along the platform train until the end vehicle axle is positioned on the end platform 1 as shown in FIG. 1a. At this point, the connecting devices 5 connecting the two adjacent end platforms 1 are removed and the pneumatic supporting means 8 on the end platform 1 are activated for moving it along horizontal surface 2 into the position shown in FIG. 1b wherein the second vehicle axle is brought to rest on the next-to-last platform 1 in the train. At this point, the second platform 1 is also disconnected from the rest and the same procedure already described is repeated until all the vehicle axles are brought to rest on a respective platform 1 as shown in FIG. 1c.

The vehicle axles are now ready for testing. The axis of each axle may be set to a given angle for simulating a given attitude in relation to horizontal surface 2, by activating lifting devices 12 on each platform 1 by feeding compressed air inside bellows 13 (FIG. 2). By appropriately regulating the air supply inside bellows 13, each plate 16 on the lifting means may be set to any required height regardless of the height of the others. The bellows 13 in each pair controlling plate 16 are conveniently connected parallel. When plates 16 are reaised independently, tubular elements 17, to which plates 16 are connected, form a given angle in relation to horizontal surface 2 so as to raise second frame 9 which rests on the said tubular elements 17 by means of saddles 30. When frame 9 is raised by lifting means 11, feet 32 on frame 9, which were previously resting on horizontal surface 2 in the idle condition, are raised off the said surface 2 so that frame 9 is supported solely by first frame 7.

For resting the weight of each wheel 4 on respective dynamometric scale 35 of measuring means 10, respective bridge plate 55 must be removed from respective side panel 20, as shown in FIG. 7, by simply removing pins 56 securing bridge plate 55 on to projecting ends 23 of cross members 21 on frame 9. Subsequent to removal of bridge plate 55, wheel 4, which is located in recess 54 on side panel 20, is allowed to drop down on to the pair of discs 36 on dynamometric scale 35, with its edge inside groove 53 of discs 36, which thus support the load transmitted by wheel 4 perpendicularly to the rail. Via the connection formed by shafts 37 and housing 45, the said load is transmitted to yoke 38 and from this to ties 39 and respective load cells 52 for measurement. The various component parts of dynamometric scale 35 combine to form a substantially isostatic system capable of withstanding extremely heavy loads and measuring the same accurately by means of load cells 52.

Idle rotation of discs 36 mainly provides for turning the supported wheel 4 when the latter is connected mechanically to another wheel on the truck rolling along rail 6 for loading the vehicle on to platforms 1. The measurements on each axle may be made while the axle is turning.

Sideways shift of the axle in relation to second frame 9 is prevented by rollers 59 (FIG. 3) each of which rests against the inner surface of wheel 4. As rollers 59 are idle, they are turned alongside rotation of respective wheel 4, with extremely little rolling friction which has no effect on the test findings.

In addition to measuring the loads transmitted by each wheel on to the rail, the apparatus according to the present invention also provides for running any other type of test using appropriate accessory equipment and devices. The position of the wheel centres and parallelism of the axles may be tested, for example, using any type of optical or electronic measuring equipment. The vehicle suspensions may be tested by appropriately setting up the vehicle by raising second frames 9 on platforms 1. The same configuration also provides for detecting the position of given suspension or vehicle body components.

To those skilled in the art it will be clear that changes may be made to the apparatus as described and illustrated herein without, however, departing from the scope of the present invention.

I claim:

1. An apparatus for manuevering and performing measurements on rail vehicles having a number of axles, characterised by the fact that it comprises a number of platforms, each designed to travel on a horizontal surface and having pneumatically supported traversing means for moving the said platform over the said surface, and a pair of parallel guides for supporting and enabling rolling of the wheels on one of the said vehicle axles; the said apparatus also comprising a number of removable connecting devices, each designed to be set to a first configuration wherein it connects two adjacent platforms with the axes of the respective said guides substantially in line, and a second configuration wherein the said two adjacent platforms are separated, so that, when the connecting devices of a series of platforms are in the said first configuration, the said platforms are so connected as to enable the wheels on the vehicle axles to be rolled on to the respective guides, so as to position a given axle on the end platform of the said series, and, when the connecting device on the end platform of the said series is set to the said second configuration, the said end platforms may be moved away from the others.

2. An apparatus as claimed in claim 1, characterised by the fact that the said horizontal surface is lower than the surface supporting the vehicle rails; the height of the said platforms being substantially equal to the difference in height between the said two surfaces, so that the respective upper surfaces of the said guides and the said rails are substantially flush.

3. An apparatus as claimed in claim 1, characterised by the fact that it comprises measuring means for measuring the loads exchanged between each said axle and the respective said parallel guides on the platform supporting the said axle.

4. An apparatus as claimed in claim 1, characterised by the fact that each said platform comprisea a first frame having the said pneumatically supported traversing means; a second frame having the said pair of guides and supporting the said measuring means; and lifting means located between the said first and second frame and designed to raise the said second frame in relation to the first.

5. An apparatus as claimed in claim 4, characterised by the fact that the said lifting means substantially comprise four lifting devices substantially arranged in the form of a rectangle and each designed to raise a respective portion of the said second frame.

6. An apparatus as claimed in claim 5, characterised by the face that the said lifting devices are air-powered and each comprise a pair of tubular bellows formed from deformable material, and on-off means for enabling compressed air to be supplied inside and exhausted from the same; the bottom end of each pair of bellows being connected to the said first frame, and the top ends of the said bellows being connected to a supporting plate.

7. An apparatus as claimed in claim 6, characterised by the fact that the supporting plates of each pair of the said lifting devices are connected by a tubular element on which is formed a pair of seats for supporting the said second frame.

8. An apparatus as claimed in claim 1, characterised by the fact that the said second frame comprises a pair of side panels, each designed to form one of the said guides, and at least two pairs of cross members for connecting the said side panels; the said measuring means being connected to a first pair of centrally-located cross members, and each cross member in the second pair being designed to support the said connecting devices.

9. An apparatus as claimed in claim 8, characterised by the fact that the said cross members in the said first and said second pair are tubular in shape and present portions projecting from the front surface of the said side panels; the said connecting devices comprising a connecting plate having a pair of holes designed to receive the said projecting portions of the cross members in the said second pair on two adjacent platforms; each of the said projecting portions presenting a hole designed to receive a pin for locking the said connecting plate in relation to the respective said projecting portion.

10. An apparatus as claimed in claim 8, characterised by the fact that the said second frame comprises two pairs of saddles arranged in the form of a rectangle and each designed to rest on a respective said supporting seat on the said first frame; the saddles in each pair being secured to a further cross member on the said second frame.

11. An apparatus as claimed in claim 8, characterised by the fact that the said second frame presents two pairs of feet designed to rest on the said horizontal surface and arranged in the form of a rectangle; the feet in each of the said pairs being connected via ball joints to a respective tubular cross bar having its axis parallel with those of the said cros members and secured to the ends of the said side panels on the said second frame.

12. An apparatus as claimed in claim 1, characterised by the fact that the said measuring means comprise a pair of dynamometric scales, each located on one side of the said second frame and designed to detect the load transmitted between a wheel on one axle and the said second frame.

13. An apparatus as claimed in claim 12, characterised by the fact that each of the said dynamometric scales comprises a pair of discs for supporting the said wheel and each turning in idle manner on the end of a respective shaft having its axis parallel with the axes of the said cross members on the said second frame; a yoke having its axis perpendicular to those of the said shafts and to which the said ends of the said two shafts are connected; and a pair of vertical ties having the bottom ends connected, via ball joints, to the ends of the said yoke, and the top ends secured to the said first cross members on the said second frame; each of the said ties comprising a load cell for detecting the axial force exerted along the said tie.

14. An apparatus as claimed in claim 13, characterised by the fact that the said yoke is connected to each of the said shafts by means of a tubular housing in which there are formed a first pair of holes fitting through with the said shaft and a second pair of holes perpendicular to the first pair and fitted through with the said yoke; the top end of the said ties being connected to the said second frame by means of a bar having its axis perpendicular to those of the said first cross members, and inserted inside a pair of end bushes, each fitted to a respective cross member.

15. An apparatus as claimed in claim 13, characterised by the fact that each of the said discs presents an annular groove for housing the edge of each said wheel; each said side panel on the said second frame presenting, next to the respective said pair of discs, a V-shaped recess designed to interrupt the continuity of the said guide formed by the said side panel and so enable the said wheel to drop down between the said two discs and so be supported solely by the same when located over the said recess.

16. An apparatus as claimed in claim 15, characterised by the fact that each of the said side panels comprises a bridge type plate connectable in removable manner to the said side panel and designed, when so connected, to support the said wheel and so prevent the same from dropping down between the said pair of discs.

17. An apparatus as claimed in claim 16, characterised by the fact that each of the said bridge plates comprises a pair of holes, each designed to receive a respective projecting portion of the said first cross members on the said second frame; each said projecting portion presenting a hole designed to receive a pin for securing the said bridge plate to the said side panel.

18. An apparatus as claimed in claim 1, characterised by the facat that each of the said side panels on the said second frame comprises a pair of rollers turning in idle manner on the said frame, having their axes parallel with the respective said side panel, and arranged in such a manner that the outer surface of each said roller rests against the inner surface of the wheel resting on the said side panel.

19. An apparatus as claimed in claim 18, characterised by the fact that the said two pairs of rollers are carried on a third frame fitted on top of the said second frame; the said second frame presenting a pair of side members secured to the cross members on the said second frame and designed to support the said third frame.

* * * * *

UNITED STATES PATENT AND TRADEMARK OFFICE
CERTIFICATE OF CORRECTION

PATENT NO. : 4,756,187

DATED : July 12, 1988

INVENTOR(S) : GUIDO GATTI

It is certified that error appears in the above-identified patent and that said Letters Patent is hereby corrected as shown below:

Col. 1, line 63, delete "air" and substitute therefore --aim--; Col. 2, line 18, after "said" delete "platform" and substitute therefore --platforms--; Col. 2, line 28, after "platform" insert "supporting the said axle."; Col. 3, line 35, delete "whael" and substitute therefore --whole--; Col. 4, line 1, after "device" delete "6" and substitute therefore --5--; Col. 6, line 22, Claim 1, after "said end" delete "platforms" and substitute therefore --platform--; Col. 7, line 2-3, Claim 4, after "said platform" delete "comprisea" and substitute therefore --comprises--; Col. 7, line 2, Claim 6, after "by the" delete "face" and substitute therefore --fact--; Col. 8, line 4, Claim 14, after "pair of holes" delete "fitting" and substitute therefore --fitted--; Col. 8, line 2, Claim 18, delete "facat" and substitute therefore --fact--.

Signed and Sealed this

Twenty-ninth Day of November, 1988

Attest:

DONALD J. QUIGG

*Attesting Officer*  *Commissioner of Patents and Trademarks*